INVENTOR.
GABOR K. UJHELYI
SERGIO T. RIBEIRO
BY ANDRAS M. BARDOS

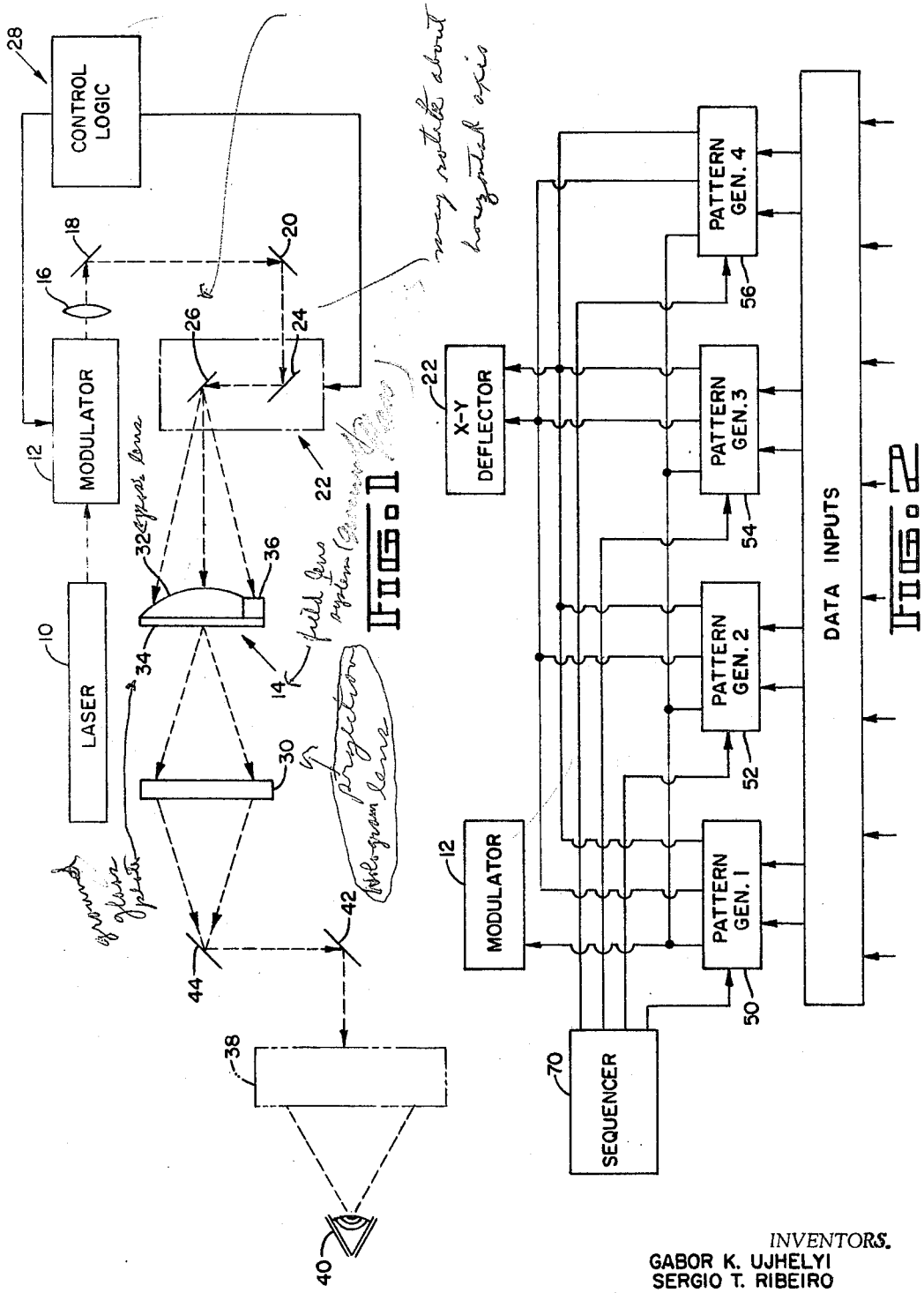

ATTORNEYS.

United States Patent Office 3,508,821
Patented Apr. 28, 1970

3,508,821
DATA DISPLAY DEVICE
Gabor K. Ujhelyi, Sergio T. Ribeiro, and Andras M. Bardos, Bristol, Conn., assignors to Carson Laboratories, Inc., Bristol, Conn., a corporation of Connecticut
Filed Aug. 11, 1966, Ser. No. 571,784
Int. Cl. G03b 21/00, 27/00; G02b 5/14
U.S. Cl. 353—10
10 Claims

ABSTRACT OF THE DISCLOSURE

A display system wherein information to be displayed is employed to modulate and deflect a beam of coherent light, the modulated and deflected light beam forming an image on a fielding element. The image created on the fielding element is projected by a hologram which is created so as to present, to the coherent light forming the image, the characteristics of a lens having a long focal length. The fielding element is positioned in the focal plane of the hologram lens and the image projected by the hologram thus appears to be located a substantial distance therefrom. The hologram lens is produced by simultaneously exposing a hologram plate to intersecting beams of coherent light emanating from two point sources respectively positioned adjacent to and a substantial distance from the plate.

---

This invention relates to display devices for imaging data to be observed. More particularly, the present invention relates to a display system wherein the data to be displayed is imaged a substantial distance from an observer.

While not limited thereto in its utility, the present invention is particularly well suited for displaying information to the operator of a vehicle, and especially for the pilot of an aircraft.

It is known to project terrain or landing environment information on the windshield of an aircraft in order to facilitate all weather operation of such vehicles. The prior art data projection systems, however, have several serious drawbacks, one drawback being that the image appears to be a short distance in front of the pilot. Accordingly, in order to see data projected upon his windshield or elsewhere in the control cabin, it is necessary for the pilot to continually refocus his eyes from infinity (far removed real objects or the outside world) to the projected image which is located relatively close by. This refocusing is, of course, quite tiresome for the eye. The eye strain is aggravated by the fact that there is also a parallax problem since two images exist, one at infinity (the outside world) and the other close by (the projected display). An additional problem of the prior art data projection systems is that the fields of vision of present display systems are severely limited. A limited vision field restricts the pilot to a narrow range of postures which, in time, may become tiresome.

The present invention overcomes the above discussed problems by providing a unique data display system which, through the use of novel projection optics, images a display to infinity thereby solving both the refocusing and parallax problems. As used herein, the term infinity designates a point lying or appearing to lie a substantial distance from the observer of the display. This unique display system also creates an artifical window of such size that the display may still be viewed by the pilot with his head anywhere within a range of normal head movements.

In the display system of the present invention, the data to be displayed is used to modulate and deflect a beam of coherent light. The thus modulated beam of coherent light creates an image which is projected to infinity by novel projection optics of light weight and small size. The projection optics include a fielding element upon which the modulation data forms an image and a lens for projecting the thus formed image, said lens having a long focal length. In order to conserve both size and weight while retaining long focal length, and in accordance with this invention, a novel hologram lens is created and utilized in the image projection system.

Accordingly, one object of the present invention is to provide a novel data display system.

Another object of the present invention is to provide a novel display system wherein the objects or data to be displayed are imaged at infinity.

Still another object of the present invention is to provide for the imaging of a display at infinity, the projection system being of smaller size and less weight than means previously available for accomplishing the same result.

Still another object of the present invention is to provide a novel display system using a hologram lens.

Still another object of the present invention is to provide a novel hologram lens.

Other objects and advantages will be apparent to those skilled in the art by reference to the following detailed description and accompanying drawing wherein like reference numerals refer to like elements in the various figures.

In the drawings:

FIGURE 1 is a block diagram of a preferred embodiment of the display system of the present invention.

FIGURE 2 is a block diagram of control circuitry which may be used in the embodiment of FIGURE 1.

Figure 3:
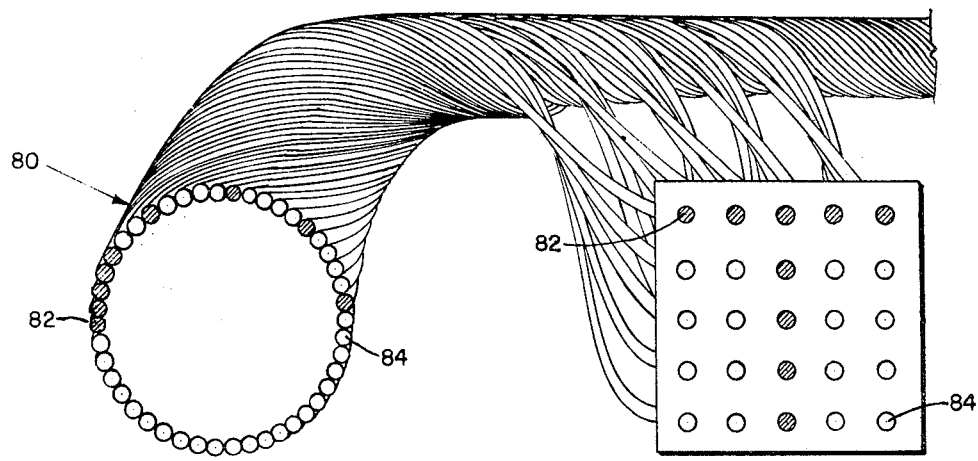
FIGURE 3 depicts an image transfer device which may be incorporated in the embodiment of FIGURE 1.

Referring now to FIGURE 1, a continuous wave gas laser 10 delivers a beam of coherent light to a modulator 12. Modulator 12 may be any one of a number of well known devices for varying the intensity of a beam of light passing therethrough such as, for example, a Kerr cell. In this regard, it is to be understood that although shown separately, modulator 12 may, if desired be a device positioned or contained within the optical cavity of laser 10 so as to vary the "Q" of the cavity in accordance with modulation data. Alternatively, the laser output may be modulated by controlling the pumping source thereby turning the laser on and off.

The modulated beam of coherent light is focused at the rear surface of a fielding element 14 by a lens 16. Positioned between lens 16 and fielding element 14 are stationary mirrors 18 and 20 which deflect the modulated beam of coherent light to an x–y deflector 22. Deflector 22 may be of the galvanometer type well known in the art. That is, deflector 22 may comprise two high speed galvanometers arranged so that a mirror 24 driven by one of the galvanometers rotates about a horizontal axis and a mirror 26 driven by the other galvanometer rotates about a vertical axis to provide vertical and horizontal deflections, respectively, to the beam.

The position of mirrors 24 and 26 in deflector 22 is controlled by pattern generators which comprise a part of the control logic system 28. Logic control system 28, which will be described in greater detail below, also provides control signals for modulator 12 so as to provide for intensity modulation of the beam of coherent light emanating from laser 10.

As noted above, the beam of coherent light is focused by lens 16 on the rear surface of fielding element 14 and is deflected about this surface by means of x–y deflector 22 in accordance with commands generated by the control logic system 28. In its simplest form, fielding element 14 may comprise merely a plate of ground glass. The purpose of the fielding element is to spread out the various rays of light passing therethrough into a wide angle beam. Restated, the fielding element directs the scatter cones of light in the proper direction such that this light falls upon a projection lens 30 having a long focal length. The fielding element 34 is in the focal plane of the projection lens 30, thus the final virtual image appears at infinity. In a preferred embodiment, as shown in FIGURE 1, the fielding element is comprised of a lens 32 having a ground glass plate 34 affixed to the surface thereof from which the light emerges. Thus, fielding element 14 may comprise a positive plano-convex lens with a ground-glass surface. Fielding efficiencies may be improved by the use of more sophisticated devices such as microprisms, fiber optics or replica gratings. For the purposes to be explained below, positioned at the base of lens 32 and behind ground glass plate 34 is an image transfer device 36 which, in a preferred embodiment, comprises a bundle of fiber optics.

Fielding element 14 and lens 30 comprise a unique projection system. As the modulated beam is deflected across the rear surface of fielding element 14, an image commensurate with the data to be displayed is formed at the face of the ground glass plate 34. A pilot or operator could, of course, see the display formed on the fielding element without further optics. However, as noted above, viewing the display on the fielding element would require refocusing of the eyes from infinity to the nearby ground glass screen. Also, if the ground glass screen comprised a part of the windshield, as would be the desired physical location; there would be a parallax problem since two images, one at infinity (the outside world) and the other at the nearby screen, would exist. As further noted above, movement of the pilot's head outside of a very narrow range would remove such a display from his field of vision.

These several problems can be solved by the use of projection optics which image the display to infinity. In order to accomplish such imaging to inifinity, it is necessary that a lens be provided which has an appropriately long focal length. The size and weight of conventional ground glass lenses to accomplish imaging at infinity, that is a lens system having an appropriate focal length, involves size and weight problems. Also, in order to achieve long focal length with a conventional lens system, a number of component lenses are needed. Thus, an additional problem arises since the conventional lens system will project a large number of disturbing ghost images due to internal reflections from the various optical interfaces in the multi-component system.

In accordance wth the teachings of the present invention, the problems inherent in conventional lens systems are obviated by a novel lens which has an appropriately long focal length and which weighs only approximately one percent as much as conventional systems. When employing the unique projection lens of the present invention, corresponding reductions in space requirements and cost are also achieved. In order to accomplish the foregoing, lens 30 is a hologram which is created by intersecting beam hologram techniques and which can perform in the manner of a lens to focus coherent light. That is, lens 30 comprises a hologram plate which has the characteristics of a lens system of conventional design with long focal length. In order to achieve long focal length, it is necessary that the hologram lens 30 take light coming from a prescribed point (the ground glass screen of fielding element 14) and focus it back at a second point (infinity).

The behavior of the hologram lens 30 may be understood by means of an analogy to a diffraction grating wherein certain portions of the incoming coherent wave front are delayed more than other portions so that the net effect on the transmitted beam is similar to that of a lens. The ordinary lens delays portions of wave fronts by causing the light rays to pass through thicker layers of glass material; in the hologram lens or diffraction grating phase shifts in the wave front are achieved by selective cancellation and reinforcement of rays from different areas of the device.

In one reduction to practice, to form a hologram lens having the characteristics above described, a hologram plate such as a Kodak 649F spectroscopic negative plate, available from Eastman Kodak Company, was exposed with a helium-neon gas laser. The exposure was made with two light beams intersecting at the plate at an angle of 22°; the light for the beams coming from the laser and thus appearing to emanate from two point sources. The two point sources are preferably generated by splitting the laser output beam. One of the point sources was close to the plate and the other was at infinity. Since one of the point sources was at infinity (actually spaced a considerable distance from the plate), the light emanating therefrom will arrive at the plate as a series of plane waves, whereas the light from the other source appears to the plate as a true point source.

Upon readout, light passing through the hologram lens from a screen or display located in the position occupied by the closer of the point sources during the making of the lens will appear to be coming from the other of the sources which, as previously noted, was located at infinity. Restated, due to phase shifts in the wave front of light waves produced by the hologram lens, a source of light viewed through the lens, such source being located at the positon of the closer of the point sources used to form the hologram lens, will appear to a viewer looking into the lens to be located at infinity since the viewer will observe plane waves of light. When points on ground glass screen 34 of fielding element 14 become point sources on readout (a full scene or data display comprising the source or sources of readout light), a full scene appearing to be positioned at infinity will be seen by an observer looking into lens 30 either directly or via mirrors 42 and 44. It should be noted that either phase holograms or absorption holograms may be employed.

By use of a deflection system which provides sufficient band width, a ground-glass spherical lens for fielding the display and a hologram projection lens consisting of a 4" by 5" photographic plate, the display may be fielded within a viewing "window" 38 which is at least 3" x 5" in size. Window 38, of course, does not actually exist, it being the boundaries of an area in which the display can be seen, and the view through hologram lens 30 is projected directly at the eye 40 of the observer by mirrors 42 and 44.

Referring now to FIGURE 2, a block diagram of control circuitry for achieving the modulation and deflection of the beam of coherent light from laser 10 is shown. The control logic comprises a series of pattern generators 50, 52, 54 and 56. In a preferred embodiment, that is in an embodiment employing an image transfer device 36 as shown in FIGURE 1, pattern generators 50, 52, and 54 can, of course, be altered with changing conditions as information is received from sensing devices such as terrain clearance radar, glide path receivers and the like. Each of the pattern generators may comprise a digital to analog converter to convert analog input information, for example from an altimeter, to digital information. The digital information is stored in a suitable memory device, such as a magnetic memory. If inconsistent with previously stored data, the new information will alter the memory. Each pattern generator contains modulation and deflection data for creating a desired visual display. When interrogated by a sequencer 70, the stored information will be read out of the memory through a digital to analog converter. Thus, analog signals for controlling the x and y deflectors are provided. In order to create a complete image, the outputs from each pattern generator must, of course, consist of synchronized modulation and deflection control signals. Also, the deflection control signals must vary in magnitude during each readout. Thus, the memory or storage unit must be scanned when interrogated. This may be accomplished by, for example, employing a magnetic tape loop as the memory for each pattern generator and starting the tape in response to interrogation by the sequencer.

Figure 4:
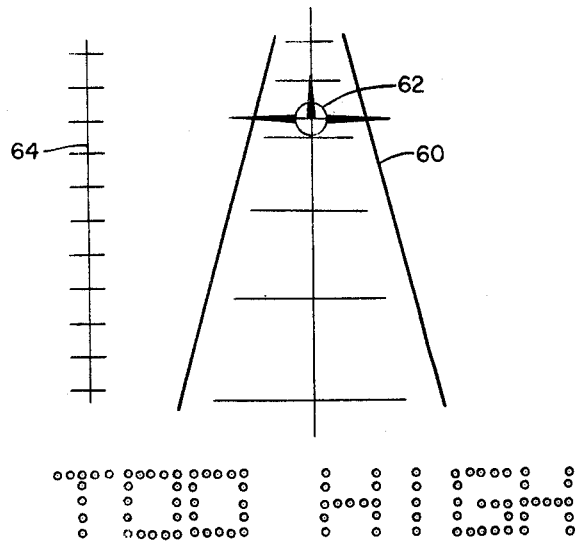
FIGURE 4 is a representation of a display of the type which might be created employing the embodiment of FIGURE 1.

Considering FIGURES 2 and 4 simultaneously, pattern generator 50 may contain data for deflecting and intensity modulating the beam of coherent light so as to create the image of a landing strip 60 or aircraft carrier at fielding element 14. Pattern generators 52 could be employed to create the image of a simulated aircraft, such as shown at 62, on the fielding element. Pattern generator 54 might contain an altitude scale 64.

As previously noted, each of the four pattern generators includes means which, when energized by a timing signal from sequencer 70, permits the modulation and deflection data stored therein to be read out. Sequencer 70 comprises a source of periodic reference voltage and means responsive thereto for generating a series of pattern generator interrogation signals at appropriate times during each cycle of the timing voltage. So as to avoid flicker, an entire display is created within 1/60 of a second. Of this period, at least 80 percent of the time is devoted to the interrogation of pattern generators 50, 52 and 54 to create images commensurate with physical objects. During the remainder of the timing voltage cycle, sequencer 70 causes read out of pattern generator 56 for the purpose of writing a message at the bottom of the display. As shown in FIGURE 4, the message advises the pilot that, as shown in the other portion of the display, his aircraft is too high to touch down at the proper landing point. The message creation modulation and deflection data in pattern generator 56 is, of course, constantly being changed in response to signals supplied by aircraft mounted sensing and computing devices.

As previously noted, during the period that pattern generator 56 is being interrogated, the information stored therein is causing the beam of coherent light to scan the rear surface of an image transfer device 36. In one form, as shown in FIGURE 3, the image transfer device comprises a bundle of optical fibers 80 arranged about a circle. The end of the fiber optic bundle upon which the beam of coherent light will impinge is arranged in a circle since, when employing a galvanometer type deflector, the beam can most readily be deflected or swept about a circle. Thus, in order to write the message in the shortest possible time and thus utilize the largest possible portion of each cycle to create a visual display which is easily comprehensible, it is desirable to deflect the beam about a circle as it writes the message. As the beam sweeps the circular path, the other ends of the fibers comprising bundle 80 may illuminate portions of a matrix in sequence. As shown in FIGURE 3 in simplified form, a 5 x 5 matrix of fibers is employed to create each character. In FIGURE 3, progressing clockwise around the circle defined by the optical fibers, twenty five fibers lying between the fibers indicated by reference numerals 82 and 84 will comprise a first character matrix. By gating the beam of coherent light on and off (intensity modulation) so as to illuminate those fibers shown cross-hatched, the character T represented by a series of illuminated spots is formed at the opposite end of the image transfer device. This character is displaced on the ground grass plate 34 of fielding element 14. It is to be understood that the transformation from a circular or linear bundle to the message matrix may be made in any form, portions of each character may be sequentially generated rather than a character by character display creation and each character may be made up of any desired number of fibers.

In operation, laser 10 provides a beam of coherent light which is either continuous or pulsed depending upon the modulation scheme employed. This coherent light is deflected by deflector 22 so as to scan the rear surface of fielding element 14. Intensity modulation and deflection of the coherent light is under the control of a plurality of pattern generators which are serially interrogated so as to provide for the formation of a display simulating one or more objects in spatial relationship to one another and, if desired, a written message. The image formed at fielding element 14 is viewed by a pilot or operator, via mirrors 42 and 44, through a hologram lens 30. Due to the unique manner in which lens 30 is prepared, light from a source positioned behind the lens (the fielding element) appears to be arriving at the lens 30 as a series of plane waves. In other words, due to the phase shifts in the wave front produced by the hologram lens 30, the image appears to be located a substantial distance behind the lens (approximately at infinity). The image is projected directly at the eye of the observer and, since it appears to be located at infinity, may be viewed without the necessity of refocusing the eyes from objects outside the vehicle and without encountering parallax problems. Also due to the manner in which the image is created and projected, particularly in view of the use of hologram lens 30, the image is fielded within a "window" of sufficient size such that it may still be viewed although the pilot moves his head within a normal range of movement. In this regard, it should be noted that physical limitations imposed by conventional lens systems prevented the creation of a viewing window larger than 3 x 5 inches. Employing the hologram lens of this invention, larger "windows" may easily be achieved.

While a preferred embodiment has been described, various modifications and substitutions may be made without departing from the spirit and scope of this invention. Thus, for many applications it may be preferred to dispense with a character generator and written message relying merely upon the display or simulated objects to convey information. Accordingly, it is to be understood that the present invention has been described by way of illustration and not limitation.

What is claimed is:

1. A display device comprising:
means for generating a beam of coherent light;
modulating means for varying the energy density of said coherent light in accordance with the data to be displayed;
means for deflecting said modulated beam of coherent light in accordance with a pattern; and
projection means responsive to impingement of said deflected beam thereon, said projection means including a hologram which presents the characteristics of a lens to coherent light emanating from said beam generator, said hologram providing an image which appears to be located a substantial distance from said projection means, said image being commensurate with said modulation and deflection data.

2. The apparatus of claim 1 wherein said hologram comprises:
a hologram plate having interference patterns characteristic of an optical lens, said patterns having been formed by exposing said hologram plate to a pair of intersecting beams of coherent light respectively emanating from sources adjacent to and a substantial distance from said plate.

3. The apparatus of claim 1 wherein said projection means further comprises:
a fielding element disposed between said deflecting means and said hologram, an image commensurate with said modulation and deflection data being formed at said fielding element, said fielding element directing coherent light commensurate with the image formed thereon to said hologram.

4. The apparatus of claim 3 further comprising:
means for focusing said modulated beam of coherent light at said fielding element.

5. The apparatus of claim 4 wherein said fielding element comprises:
transparent means for spreading and directing the coherent light passing therethrough to said lens; and a fiber optic image transfer device.

6. The apparatus of claim 5 wherein said deflecting means comprises:
means for deflecting said beam about two axes;
pattern generator means for generating at least first and second pairs of deflection control signals, said pairs of signals sharing a cycle of image creation time; and
means for sequentially applying said deflection control signals to said deflecting means whereby said beam will be deflected about a face of said fielding element during a first portion of said cycle and about a first end of said fiber optic image transfer device during a second portion of said cycle.

7. The apparatus of claim 6 wherein said pattern generator means comprises:
first signal generator means for providing synchronized deflection and modulation control signals for the creation of a first pattern; and
second signal generator means for providing synchronized deflection and modulation control signals for the creation of a first character.

8. The apparatus of claim 7 wherein said means for sequentially applying deflection signals to the deflecting means also applies the synchronized modulation control signals to the modulating means.

9. The apparatus of claim 4 wherein said fielding element comprises:
transparent means for spreading and directing the coherent light passing therethrough to said hologram.

10. The apparatus of claim 9 wherein said deflecting means comprises:
means for deflecting said beam about two axes;
first signal generator means for providing synchronized deflection and modulation control signals for the creation of a first pattern;
second signal generator means for providing synchronized deflection and modulation control signals for the creation of a second pattern; and
means for sequentially applying said synchronized deflection and modulation control signals from said first and second signal generator means respectively to said deflecting and modulating means.

References Cited
UNITED STATES PATENTS

| | | | |
|---|---|---|---|
| 3,131,487 | 5/1964 | Lyon et al. | 88—24 |
| 3,184,872 | 5/1965 | Way | 350—96 |
| 3,325,594 | 6/1967 | Goldhammer et al. | 350—96 XR |
| 3,331,651 | 7/1967 | Sterzer | 350—160 XR |

NORTON ANSHER, Primary Examiner

R. M. SHEER, Assistant Examiner

U.S. Cl. X.R.

353—122, 11; 350—3.5, 96; 355—2